United States Patent
Khadiwala et al.

(10) Patent No.: US 10,180,880 B2
(45) Date of Patent: Jan. 15, 2019

(54) ADAPTIVE REBUILDING RATES BASED ON SAMPLING AND INFERENCE

(71) Applicant: International Business Machines Corporation, Armonk, NY (US)

(72) Inventors: Ravi V. Khadiwala, Bartlett, IL (US); Jason K. Resch, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/686,980

(22) Filed: Aug. 25, 2017

(65) Prior Publication Data
US 2018/0004604 A1    Jan. 4, 2018

Related U.S. Application Data (63) Continuation-in-part of application No. 14/287,499, filed on May 27, 2014, now Pat. No. 9,848,044.
(Continued)

(51) Int. Cl.
| | |
|---|---|
| *G06F 9/46* | (2006.01) |
| *G06F 11/10* | (2006.01) |
| *G06F 11/07* | (2006.01) |
| *G06F 17/30* | (2006.01) |
| *G06F 3/06* | (2006.01) |

(Continued)

(52) U.S. Cl.
CPC ........ *G06F 11/1092* (2013.01); *G06F 3/0604* (2013.01); *G06F 9/5066* (2013.01); *G06F 11/07* (2013.01); *G06F 11/1448* (2013.01); *G06F 11/1458* (2013.01); *G06F 17/30067* (2013.01); *H04L 67/1097* (2013.01); *G06F 11/1076* (2013.01); *G06F 2003/0697* (2013.01);

(Continued)

(58) Field of Classification Search
CPC ..................................................... G06F 9/4881
USPC ......................................................... 718/103
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |

(Continued)

OTHER PUBLICATIONS

Shamir; How to Share a Secret; Communications of the ACM; vol. 22, No. 11; Nov. 1979; pp. 612-613.
(Continued)

*Primary Examiner* — Mehran Kamran
(74) *Attorney, Agent, or Firm* — Garlick & Markison; Timothy W. Markison; Randy W. Lacasse (57) ABSTRACT

A method for execution by one or more processing modules of a dispersed storage network (DSN), the method begins by monitoring an encoded data slice access rate to produce an encoded data slice access rate for an associated rebuilding rate of a set of rebuilding rates. The method continues by applying a learning function to the encoded data slice access rate based on a previous encoded data slice access rate associated with the rebuilding rate to produce an updated previous encoded data slice access rate of a set of previous encoded data slice access rates. The method continues by updating a score value associated with the updated previous encoded data slice access rate and the rebuilding rate and selecting a slice access scheme based on the updated score value where a rebuild rate selection will maximize a score value associated with an expected slice access rate.

18 Claims, 6 Drawing Sheets

Related U.S. Application Data (60) Provisional application No. 61/860,456, filed on Jul. 31, 2013.

(51) Int. Cl.
 *H04L 29/08* (2006.01)
 *G06F 9/50* (2006.01)
 *G06F 11/14* (2006.01)

(52) U.S. Cl.
 CPC ............... *G06F 2209/5017* (2013.01); *G06F 2211/1028* (2013.01)

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 6,973,650 B1* | 12/2005 | Parkes .................. G06F 9/4843 711/118 |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 7,849,044 B2* | 12/2010 | Nelken ................ G06F 9/4881 379/265.06 |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0125793 A1* | 6/2005 | Aguilar, Jr. ............ G06F 9/4843 718/100 |
| 2005/0131993 A1 | 6/2005 | Fatula |
| 2005/0132070 A1 | 6/2005 | Redlich et al. |
| 2005/0132252 A1* | 6/2005 | Fifer .................. G06F 11/2064 714/15 |
| 2005/0144382 A1 | 6/2005 | Schmisseur |
| 2005/0229069 A1 | 10/2005 | Hassner et al. |
| 2006/0047907 A1 | 3/2006 | Shiga et al. |
| 2006/0107268 A1* | 5/2006 | Chrabieh ............. G06F 9/4881 718/100 |
| 2006/0136448 A1 | 6/2006 | Cialini et al. |
| 2006/0156059 A1 | 7/2006 | Kitamura |
| 2006/0224603 A1 | 10/2006 | Correll |
| 2006/0230403 A1* | 10/2006 | Crawford ......... G05B 19/41865 718/100 |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters et al. |
| 2008/0021987 A1* | 1/2008 | Bates .................... G06F 9/5044 709/223 |
| 2008/0155540 A1* | 6/2008 | Mock ..................... G06Q 10/06 718/100 |
| 2008/0215405 A1* | 9/2008 | Dibbern ............. G06F 9/45512 705/7.27 |
| 2009/0070773 A1* | 3/2009 | Depoutovitch ........ G06F 9/5027 718/106 |
| 2009/0094251 A1 | 4/2009 | Gladwin et al. |
| 2009/0094318 A1 | 4/2009 | Gladwin et al. |
| 2010/0005472 A1* | 1/2010 | Krishnaraj ............ G06F 9/5038 718/104 |
| 2010/0023524 A1 | 1/2010 | Gladwin et al. |
| 2010/0023606 A1* | 1/2010 | Gerdes .................... H04L 67/16 709/221 |
| 2010/0057514 A1* | 3/2010 | Chee ..................... G06Q 10/06 705/80 |
| 2010/0332281 A1* | 12/2010 | Horvitz ............. G06Q 10/06311 705/7.13 |
| 2011/0231702 A1* | 9/2011 | Allen ..................... G06F 9/546 714/18 |
| 2011/0264480 A1* | 10/2011 | Gaisford ............... G06Q 10/06 705/7.23 |
| 2011/0264593 A1* | 10/2011 | Gaisford ............... G06Q 10/06 705/301 |
| 2012/0011511 A1* | 1/2012 | Horvitz .................... G06F 9/461 718/100 |
| 2012/0042075 A1* | 2/2012 | Goetz .................... G06F 9/5072 709/226 |
| 2012/0095908 A1* | 4/2012 | Barrie .................... G06Q 10/06 705/39 |
| 2012/0158196 A1* | 6/2012 | Eldershaw ............... H02J 3/381 700/287 |
| 2012/0185848 A1* | 7/2012 | Devarakonda ........ G06F 9/5077 718/1 |
| 2013/0198756 A1* | 8/2013 | Grube .................. G06F 11/2094 718/104 |
| 2013/0232184 A1* | 9/2013 | Grube .................. H04L 29/08135 709/201 |
| 2014/0156716 A1* | 6/2014 | Baptist .................. G06F 17/30194 707/827 |
| 2014/0304713 A1* | 10/2014 | Olsson .................. G06F 9/5072 718/106 |
| 2017/0139843 A1* | 5/2017 | Resch .................... H04L 63/0428 |
| 2017/0149899 A1* | 5/2017 | Alnafoosi ............... H04L 67/10 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

(56) References Cited

OTHER PUBLICATIONS

Chung; An Automatic Data Segmentation Method for 3D Measured Data Points; National Taiwan University; pp. 1-8; 1998.
Plank, T1: Erasure Codes for Storage Applications; FAST2005, 4th Usenix Conference on File Storage Technologies; Dec. 13-16, 2005; pp. 1-74.
Wildi; Java iSCSi Initiator; Master Thesis; Department of Computer and Information Science, University of Konstanz; Feb. 2007; 60 pgs.
Legg; Lightweight Directory Access Protocol (LDAP): Syntaxes and Matching Rules; IETF Network Working Group; RFC 4517; Jun. 2006; pp. 1-50.
Zeilenga; Lightweight Directory Access Protocol (LDAP): Internationalized String Preparation; IETF Network Working Group; RFC 4518; Jun. 2006; pp. 1-14.
Smith; Lightweight Directory Access Protocol (LDAP): Uniform Resource Locator; IETF Network Working Group; RFC 4516; Jun. 2006; pp. 1-15.
Smith; Lightweight Directory Access Protocol (LDAP): String Representation of Search Filters; IETF Network Working Group; RFC 4515; Jun. 2006; pp. 1-12.
Zeilenga; Lightweight Directory Access Protocol (LDAP): Directory Information Models; IETF Network Working Group; RFC 4512; Jun. 2006; pp. 1-49.
Sciberras; Lightweight Directory Access Protocol (LDAP): Schema for User Applications; IETF Network Working Group; RFC 4519; Jun. 2006; pp. 1-33.
Harrison; Lightweight Directory Access Protocol (LDAP): Authentication Methods and Security Mechanisms; IETF Network Working Group; RFC 4513; Jun. 2006; pp. 1-32.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 1511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

ADAPTIVE REBUILDING RATES BASED ON SAMPLING AND INFERENCE

CROSS-REFERENCE TO RELATED APPLICATIONS

The present U.S. Utility Patent Application claims priority pursuant to 35 U.S.C. § 120 as a continuation-in-part of U.S. Utility application Ser. No. 14/287,499, entitled "DISTRIBUTED STORAGE NETWORK WITH COORDINATED PARTIAL TASK EXECUTION AND METHODS FOR USE THEREWITH", filed May 27, 2014, which claims priority pursuant to 35 U.S.C. § 119(e) to U.S. Provisional Application No. 61/860,456, entitled "ESTABLISHING A SLICE REBUILDING RATE IN A DISPERSED STORAGE NETWORK", filed Jul. 31, 2013, both of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to rebuilding dispersed error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

DETAILED DESCRIPTION OF THE INVENTION

Figure 1:
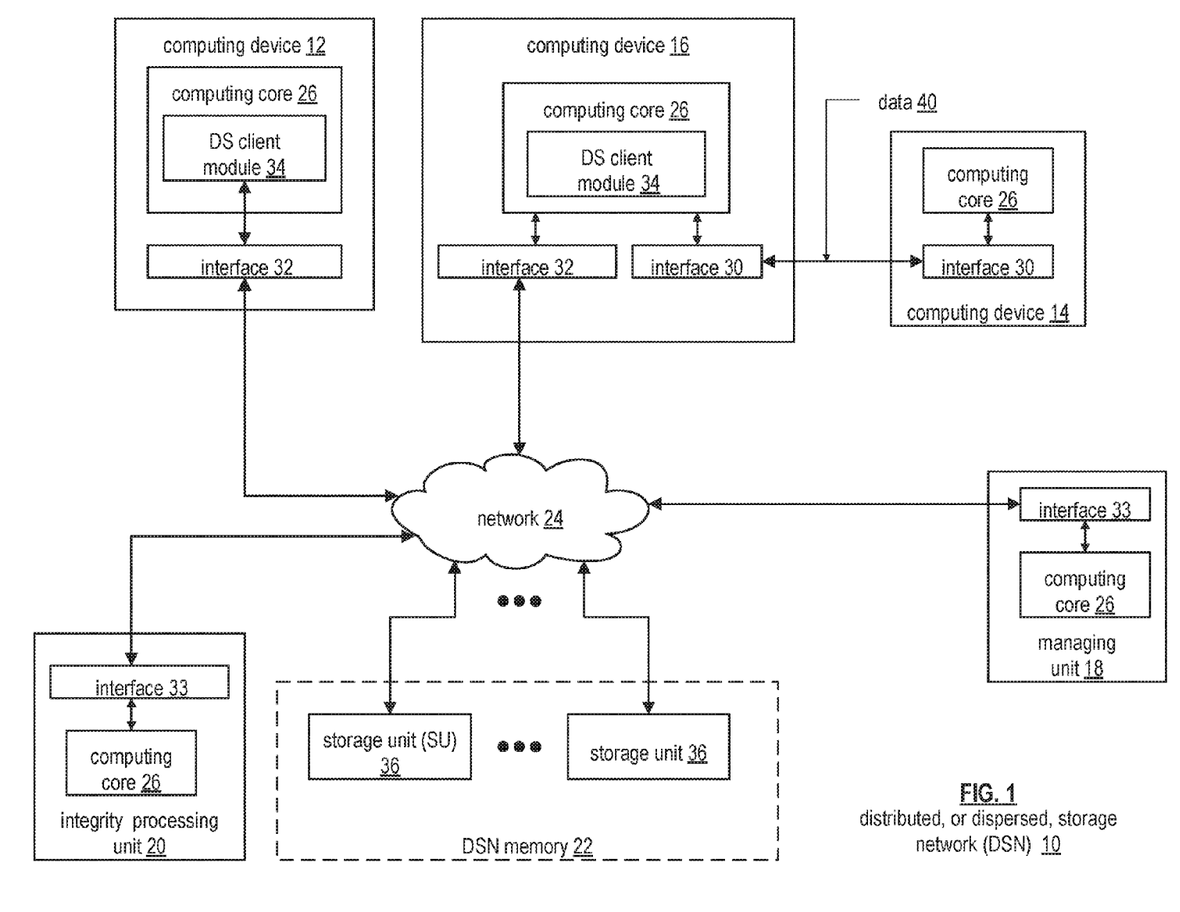
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
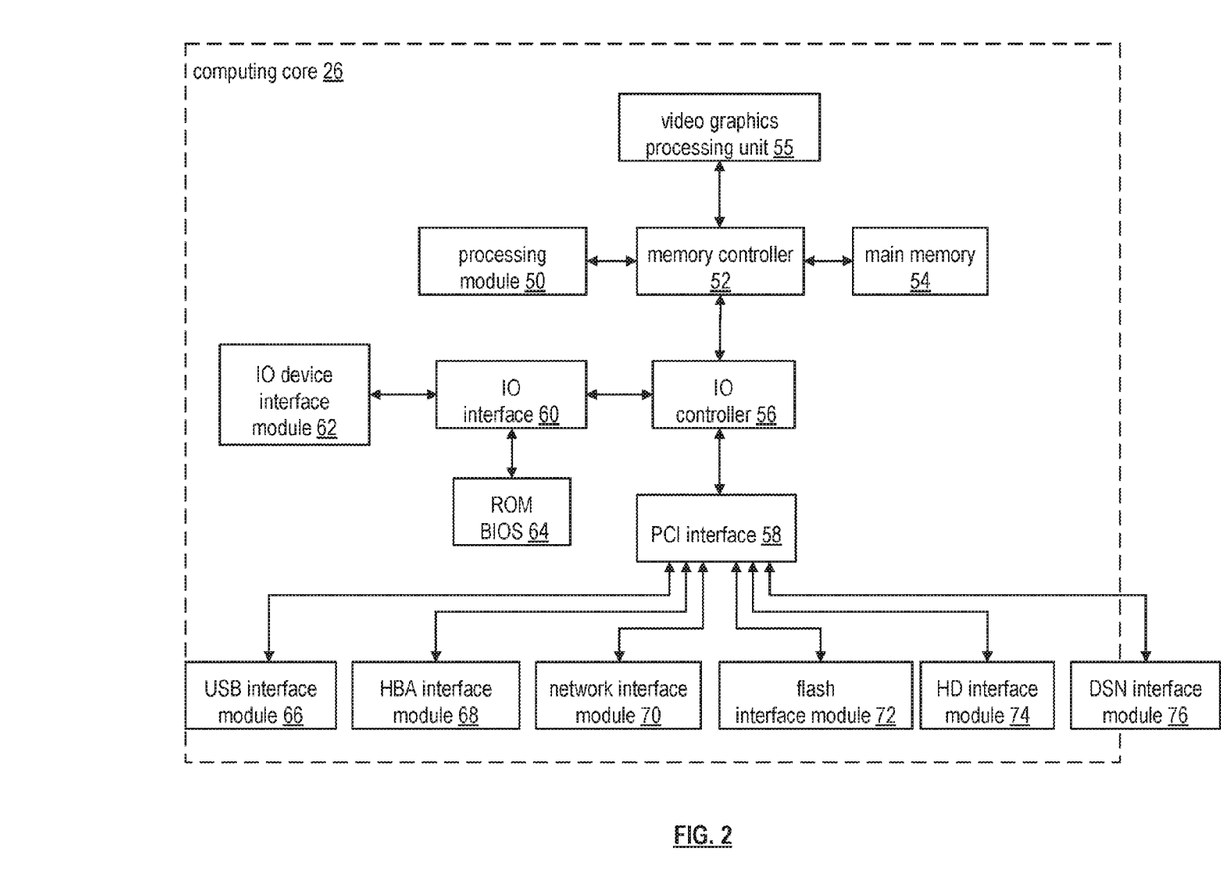
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN (distributed storage and task network) memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate per-access billing information. In another instance, the DSTN managing unit 18 tracks the amount of data stored and/or retrieved by a user device and/or a user group, which can be used to generate per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figures 3, 4:
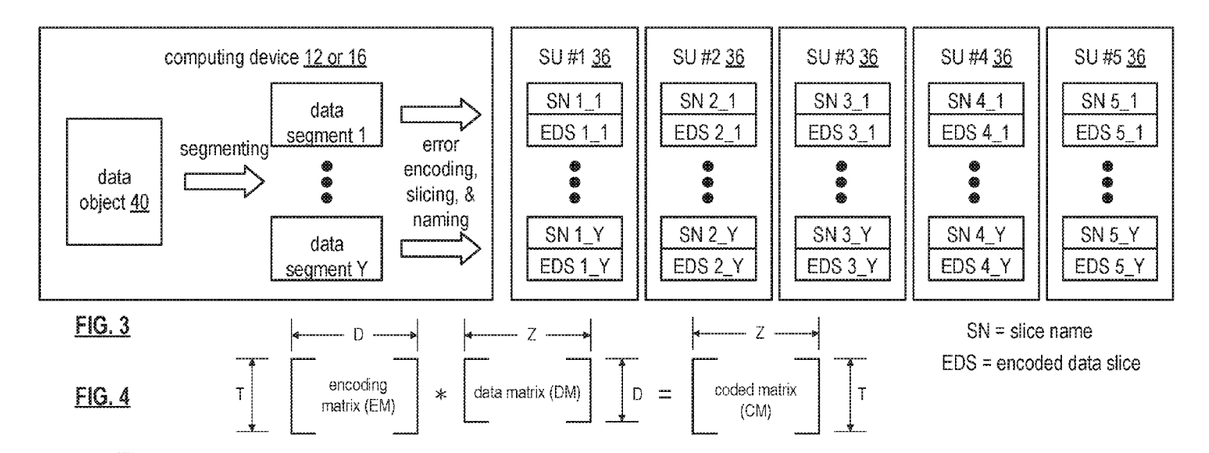
FIG. 3 is a schematic block diagram of an example of dispersed storage error encoding of data in accordance with the present invention.
FIG. 4 is a schematic block diagram of a generic example of an error encoding function in accordance with the present invention.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity check-sum, etc.).

Figure 5:
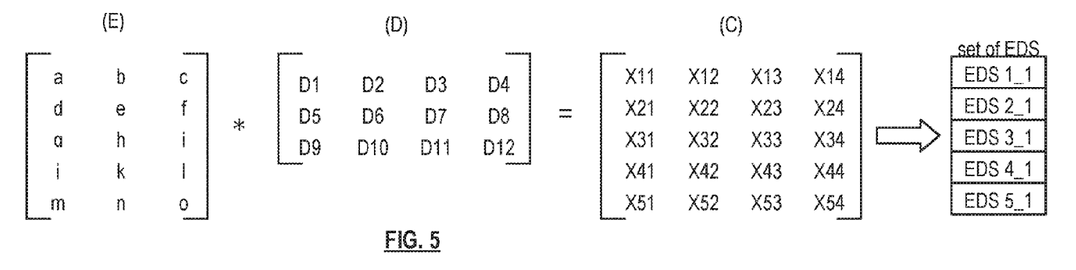
FIG. 5 is a schematic block diagram of a specific example of an error encoding function in accordance with the present invention.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Figure 6:
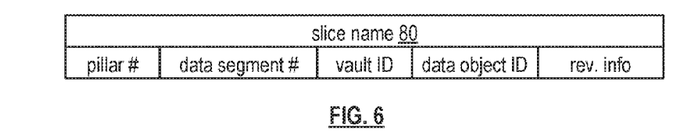
FIG. 6 is a schematic block diagram of an example of a slice name of an encoded data slice (EDS) in accordance with the present invention.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
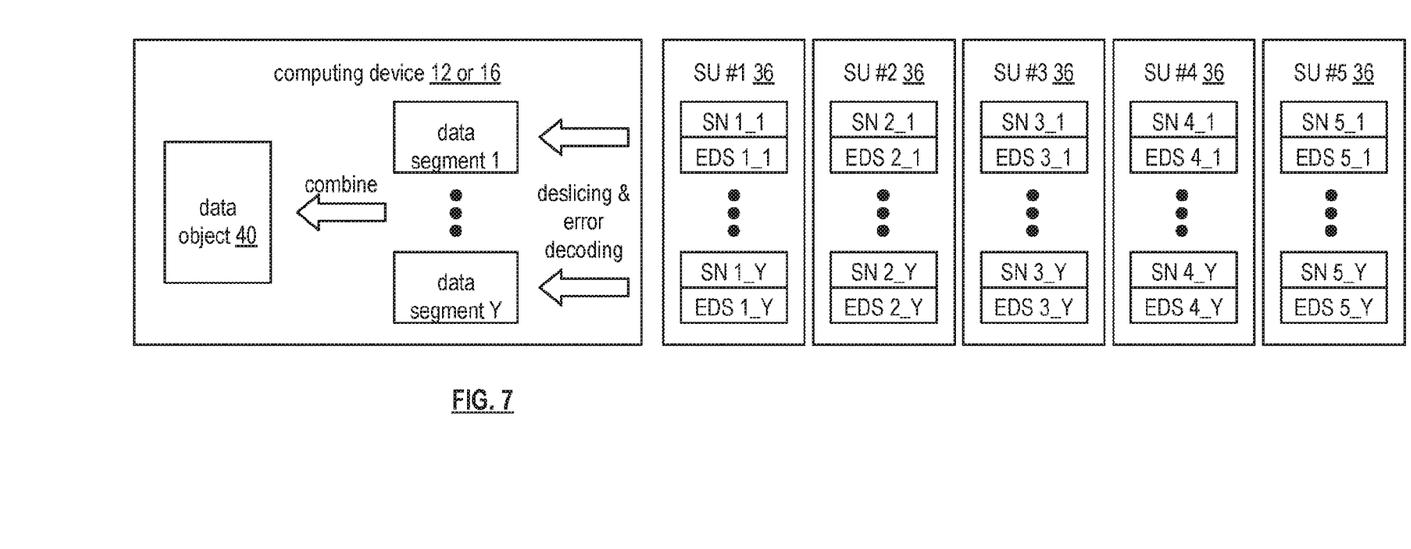
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
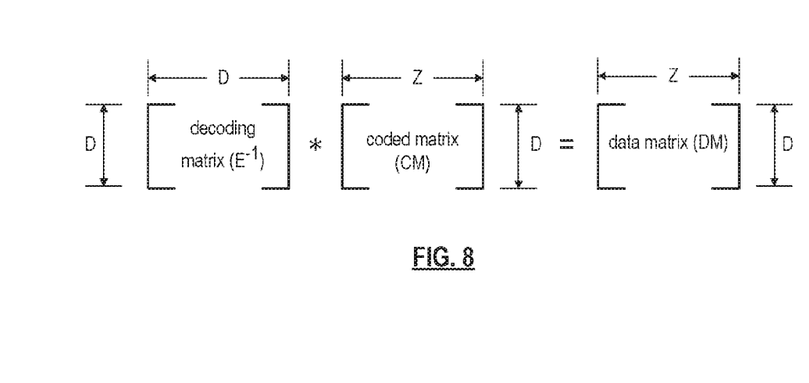
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9A:
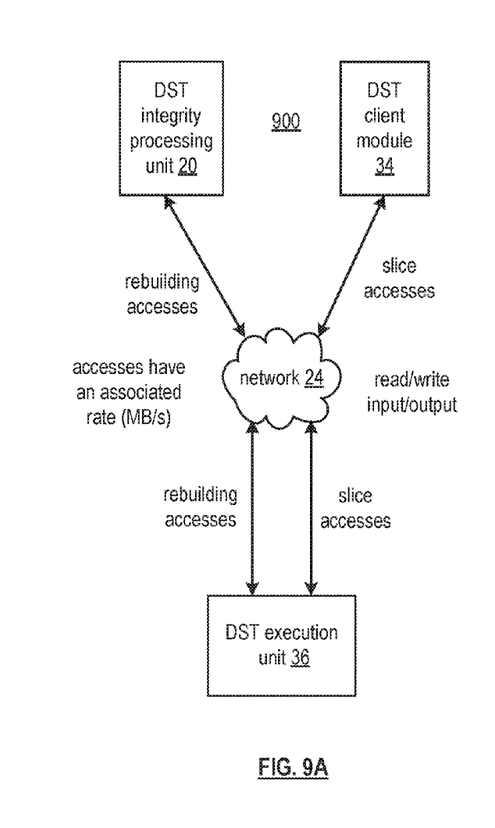
FIG. 9A is a schematic block diagram of another embodiment of a dispersed storage network (DSN) system in accordance with the present invention.

FIG. 9A is a schematic block diagram 900 of another embodiment of a dispersed storage network (DSN) system that includes the distributed storage and task (DST) integrity processing unit 20, the DST client module 34, the network 24, and the DST execution unit (e.g., storage unit 36) of FIG. 1. Alternatively, the DST integrity processing unit 20 may be implemented as the DST execution unit. The DST client module 34 may be implemented as the user device 12 or the DST processing unit 16 of FIG. 1.

According to one embodiment, an optimum rebuild rate is determined through an intelligent adaptive process, to minimize disruption to normal I/O (Input/Output) operations while at the same time maximizing the rebuild rate. The process assumes that sufficiently high rebuild rates may have a detrimental effect on normal I/O operations. The DST integrity processing unit 20 issues rebuilding access requests via the network 24 to the DST execution unit to facilitate rebuilding the one or more encoded data slices (slices) associated with a slice error. The rebuilding access requests includes one or more of a list range request, a list digest of a range request, a read slice request, or a write rebuilt slice request. Substantially simultaneously, the DST client module 34 issues slice access requests via the network 24 to the DST execution unit with regards to accessing encoded data slices stored in the DST execution unit. The slice access requests include at least one of a read request, a write request, a delete request, or a list request. A rate of the rebuilding access requests may be associated with a controlled rate (e.g., by the DST integrity processing unit 20) of rebuilding encoded data slices based on a rate of detecting the slice errors. A rate of the slice access requests may be associated with a rate of accessing by a plurality of DSN users.

The DST execution unit may be associated with an overall access rate to accommodate both the rebuilding access requests and the slice access requests. As such, the DST execution unit may accommodate more rebuilding access requests when there are fewer slice access requests or may accommodate more slice access requests when there are fewer rebuilding access requests. Accordingly, when the DST integrity processing unit 20 establishes the rate for the rebuilding access requests, a resulting rate of slice access requests may be realized (e.g., roughly as a difference between the overall access rate minus the established rate for the rebuilding access requests).

The DST integrity processing unit 20 determines the rate for the rebuilding access requests to achieve the desired rebuilding access request rate and a resulting acceptable rate of the slice access requests. As an example, the DST integrity processing unit 20 detects resulting slice access performance rates for a corresponding selected rebuilding access performance rates to produce scoring information. When adjusting the rate for the rebuilding access request, the DST integrity processing unit selects the rate for the rebuilding access requests based on a desired rate of slice access requests in accordance with the scoring information. From time to time, the DST integrity processing unit 20 updates the scoring information based on observed rates of slice access requests for corresponding selected rates for the rebuilding access requests. Such scoring information is discussed in greater detail with reference to FIG. 9B.

Figure 9B:
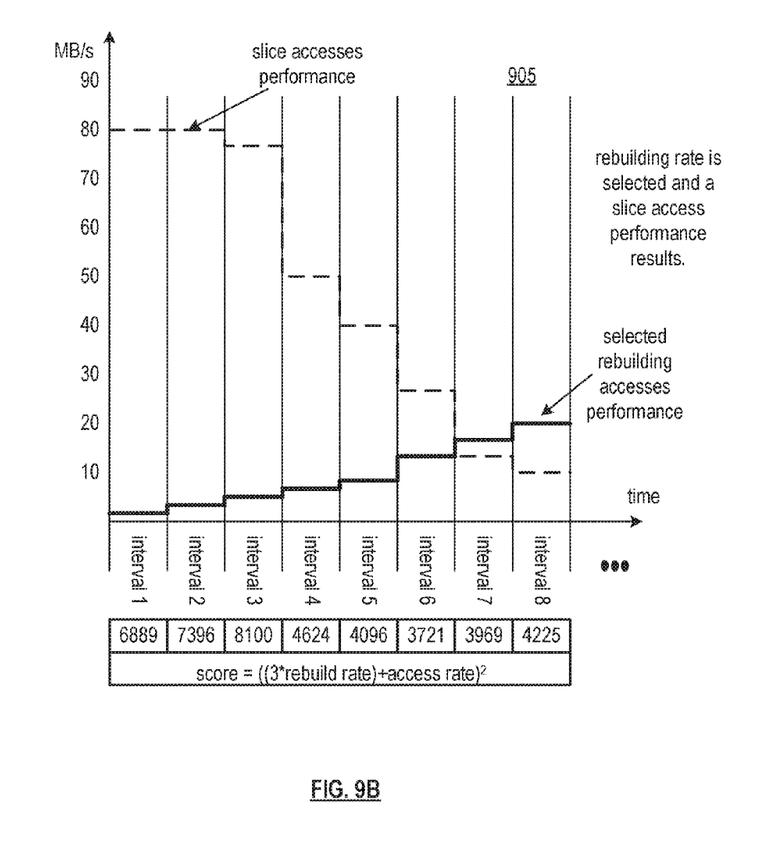
FIG. 9B is a timing diagram illustrating an example of access performance in accordance with the present invention.

FIG. 9B is a timing diagram 905 illustrating an example of access performance that includes a graphical indication of resulting slice access performance levels (e.g., megabytes per second) for selected rebuilding access performance levels (e.g., megabytes per second) for a series of time intervals 1-8, and a resulting set of scores for the set of time intervals. The score may be generated based on a function of slice access performance rate and slice rebuilding access rate.

For a given selected rebuilding rate, an associated score may be subsequently updated in accordance with a learning rate function when an updated corresponding slice access rate is measured for the given selected rebuilding rate. For example, the associated score may be subsequently updated in accordance with a learning rate function formula of:

updated score=(old score)*(1−learning rate)+(new score*learning rate).

At each time interval T, the rebuild process selects a rate at which to rebuild data from a range of possible rebuild rates. For example, 1, 2, 4, 6, 8, 12, 16, and 20 MB/s. During the same time interval, the rebuild process monitors the aggregate rate of normal I/O operations processed in T. As previously described, a score function is calculated based on the rebuild rate and the observed normal I/O rate. As one example, the score is calculated as:

$((N^*\text{rebuild rate})+\text{access rate})^2$, where $N$ is a multiplier of the rebuild rate.

For example, if the multiplier were 3, and the rebuild rate was 20 MB/s, and the client I/O rate was 70 MB/s. Then the score would be calculated as $((3*20)+70)^2=16,900$.

Over time, the process arrives at a score for each of the possible rebuild rates, for example representing the observations and calculated scores in a table:

| | Rebuild rate: | | | | | | | |
|---|---|---|---|---|---|---|---|---|
| | 1 | 2 | 4 | 6 | 8 | 12 | 16 | 20 |
| Observed normal I/O: | 80 | 80 | 78 | 50 | 40 | 25 | 15 | 05 |
| Score value: | 6889 | 7396 | 8100 | 4624 | 4096 | 3721 | 3969 | 4225 |

The value of the score is used to bias the selection of the next rate to use. For example, by finding the sum total of all the score values: (6889+7396+8100+4624+4096+3721+3969+4225)=43,020, then each score value can be divided by this sum to get a probability, and the sum of all the probabilities will add to 100%.

Below is a calculation of the selection rate for each rebuild rate:

| Selection rate: | 16.0% | 17.2% | 18.8% | 10.7% | 9.5% | 8.6% | 9.2% | 9.8% |
|---|---|---|---|---|---|---|---|---|

Therefore, for each time interval T, the rebuild process will use the above weighted probabilities for the selection of the next rebuild rate to use. There is a bias towards those rates that result in the greatest calculated score. Because network conditions and normal I/O throughput are subject to many variables, these observations are subject to constant change. Therefore, the rebuild process must constantly update these rates with information from new observations. As previously discussed, rather than completely discard/replace the previous measurement with the new one, a "learning rate" may be applied to lend variable levels of significance to the new observation. For example, with a learning rate of 0.1, the result is updated as:

New result=(Old result)*(1−0.1)+(Latest observation*0.1). For example, if the rebuild process selected rebuild rate of 2 MB/s, and observed a new normal I/O rate of 90 MB/s, then the previous result of 80 MB/s would be updated to: 80*(1−0.01)+(90*0.1)=81. Lower learning rates prevent high degrees of noise from causing wild disruptions in the consideration of the current I/O, while higher learning rates cause faster adaptation in changing conditions.

Figure 9C:
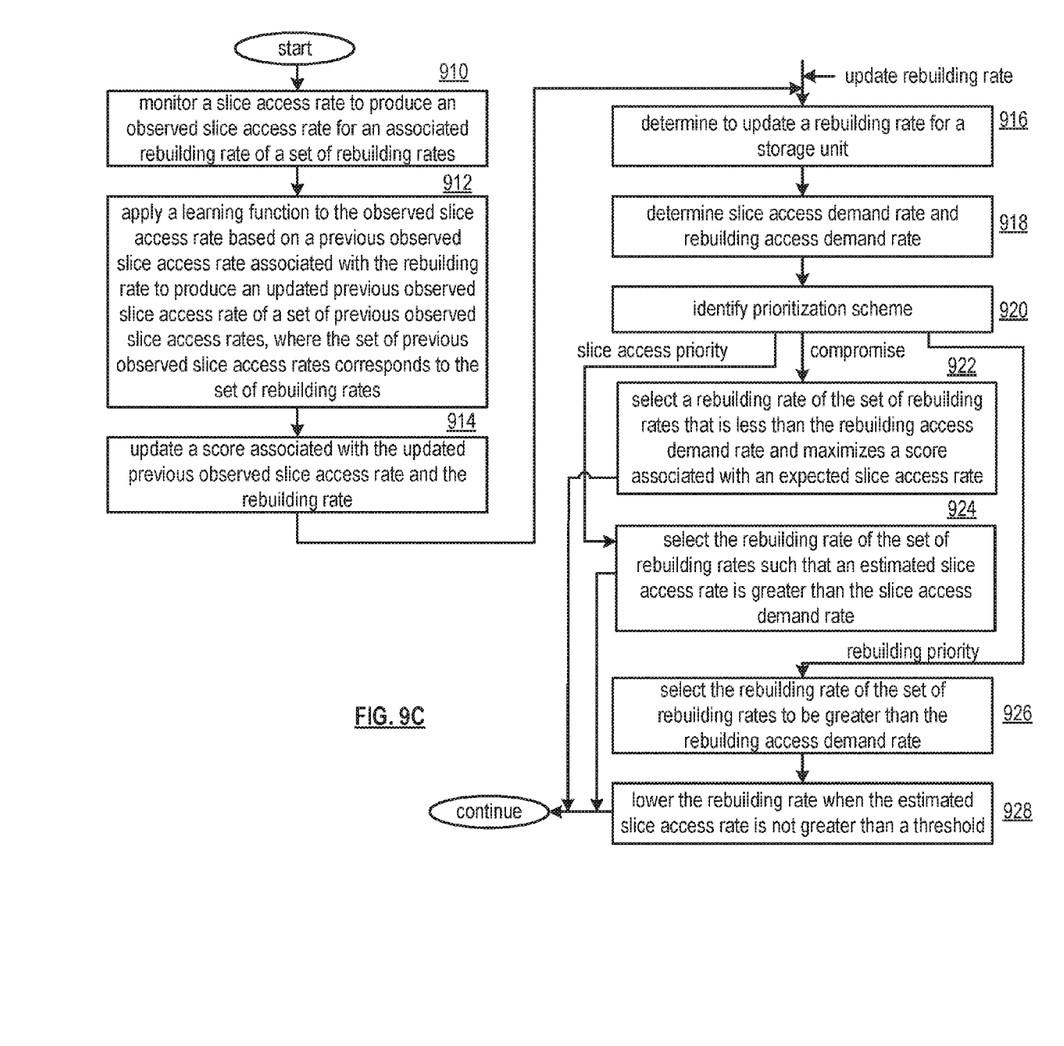
FIG. 9C is a flowchart illustrating an example of prioritizing access rates in accordance with the present invention.

FIG. 9C is a flowchart illustrating an example of prioritizing access rates. In particular, a method is presented for use in conjunction with one or more functions and features described in conjunction with FIGS. 1-2, 3-8, 9A, 9B and also FIG. 9C.

The method described above in conjunction with the processing module can alternatively be performed by other modules of the dispersed storage network or by other computing devices. In addition, at least one memory section (e.g., a non-transitory computer readable storage medium) that stores operational instructions can, when executed by one or more processing modules of one or more computing devices of the dispersed storage network (DSN), cause the one or more computing devices to perform any or all of the method steps described above.

The method begins at a step 910 where a processing module (e.g., of a distributed storage and task (DST) integrity processing unit) monitors an encoded data slice access rate (access rate) to produce an observed encoded data slice access rate for an associated rebuilding rate of a set of rebuilding rates. The monitoring includes at least one of performing a test, initiating a query, and receiving access rate information.

The method continues at step 912 where the processing module applies a learning function to the observed encoded data slice access rate based on a previous observed encoded data slice access rate associated with the rebuilding rate to produce an updated previous observed encoded data slice access rate of a set of previous observed encoded data slice access rates, where the set of previous observed encoded data slice access rate corresponds to the set of rebuilding rates. The method continues at step 914 where the processing module updates a score associated with the updated previous observed encoded data slice access rate and the rebuilding rate.

In an example of updating a rebuilding rate, the method continues at step 916 where the processing module determines to update the rebuilding rate for a storage unit. The determining may be based on one or more of detecting an end of a time interval, receiving a request, receiving an error message, or detecting an unfavorable encoded data slice access rate. The method continues at step 918 where the processing module determines encoded data slice access demand rate and rebuilding access demand rate. The determining may be based on one or more of interpreting a queue, receiving a request, or accessing a historical record.

The method continues at step 920 where the processing module identifies a prioritization scheme of one of an encoded data slice access priority scheme, a compromise scheme, or a rebuilding priory scheme. The identifying may be based on one or more of a predetermination, detecting that a demand rate is much greater than a demand threshold level, or receiving a request. For example, the processing module selects the encoded data slice access priority scheme when the encoded data slice access demand rate is much greater than the rebuilding access demand rate. As another example, the processing module selects the rebuilding priory scheme when the rebuilding access demand rate is much greater than the encoded data slice access demand rate. As yet another example, the processing module selects the compromise scheme when the encoded data slice access demand rate and the rebuilding access demand rate are substantially similar (e.g., the same or within a set threshold value).

When the processing module selects the compromise prioritization scheme, the method continues at step 922 where the processing module selects a rebuilding rate of the set of rebuilding rates that is less than the rebuilding access demand rate and maximizes a score associated with an expected encoded data slice access rate. The selecting may be based on one or more of accessing a table, accessing a record, and calculating the rebuilding rate.

When the processing module selects the encoded data slice access priority scheme, the method continues at step 924 where the processing module selects the rebuilding rate of the set of rebuilding rates such that an estimated encoded data slice access rate is greater than the encoded data slice access demand rate. For example, the processing module selects the rebuilding rate from the scoring information such that the rebuilding rate is associated with an encoded data slice access rate that is greater than the encoded data slice demand rate.

When the processing module selects the rebuilding priory scheme, the method continues at step 926 where the processing module selects the rebuilding rate of the set of rebuilding rates to be greater than the rebuilding access demand rate. For example, the processing module selects the rebuilding rate to be just greater than a rebuilding rate of the scoring information. The method continues at step 928 where the processing module lowers the rebuilding rate when the estimated encoded data slice access rate is not greater than a threshold. For example, the processing module determines the threshold based on an encoded data slice access demand rate and a minimum difference.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data'). In addition, the terms "slice" and "encoded data slice" are used interchangeably.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more processing modules of one or more computing devices of a dispersed storage network (DSN), the method comprises:
monitoring an encoded data slice access rate to produce an observed encoded data slice access rate for an associated rebuilding rate of a set of rebuilding rates;
applying a learning rate function to the observed encoded data slice access rate based on a previous observed encoded data slice access rate associated with the rebuilding rate to produce an updated previous observed encoded data slice access rate of a set of previous observed encoded data slice access rates, where the set of previous observed encoded data slice access rates corresponds to the set of rebuilding rates;
updating a score value associated with the updated previous observed encoded data slice access rate and the rebuilding rate, wherein the score value is calculated as: $((N*\text{rebuild rate})+\text{encoded data slice access rate})^2$, where N is a multiplier of the rebuild rate; and
selecting an encoded data slice access scheme based on the updated score value where a rebuild rate selection will maximize a score value associated with an expected encoded data slice access rate; and
rebuilding the encoded data slice in DSN storage using the encoded data slice access scheme.

2. The method of claim 1 further comprising updating the rebuilding rate by determining an encoded data slice access demand rate and a rebuilding access demand rate.

3. The method of claim 1, wherein the encoded data slice access scheme is a priority encoded data slice access when an encoded data slice access demand rate is much greater than a rebuilding access demand rate.

4. The method of claim 1, wherein the encoded data slice access scheme is a rebuilding priority scheme when a rebuilding access demand rate is much greater than an encoded data slice access demand rate.

5. The method of claim 1, wherein the encoded data slice access scheme is a compromise scheme when a rebuilding access demand rate is substantially similar to an encoded data slice access demand rate.

6. The method of claim 5 further comprising selecting a rebuilding rate of the set of rebuilding rates that is less than a rebuilding access demand rate and maximizes a score value associated with an expected slice access rate.

7. The method of claim 1, wherein the score value is calculated as:

$((3*\text{rebuild rate})+\text{encoded data slice access rate})^2$.

8. The method of claim 1, wherein the learning rate function is calculated as:

updated score=(old score)*(1−learning rate)+(new score*learning rate).

9. The method of claim 1, wherein rebuilding access requests includes one or more of a list range request, a list digest of a range request, a read slice request, or a write rebuilt slice request.

10. The method of claim 1, wherein slice access requests include at least one of a read request, a write request, a delete request, or a list request.

11. The method of claim 1, wherein the monitoring includes at least one of: performing a test, initiating a query, or receiving access rate information.

12. The method of claim 1, wherein determining to update the rebuilding rate for a storage unit is based on one or more of: detecting an end of a time interval, receiving a request, receiving an error message, or detecting an unfavorable slice access rate.

13. The method of claim 1, wherein determining a slice access demand rate and rebuilding access demand rate is based on one or more of: interpreting a queue, receiving a request, or accessing a historical record.

14. The method of claim 1, wherein selecting an encoded data slice access scheme is based on one or more of: a predetermination, detecting that a demand rate is much greater than a demand threshold level, or receiving a request.

15. A computing device of a group of computing devices of a dispersed storage network (DSN), the computing device comprises:
an interface;
a local memory; and
a processing module operably coupled to the interface and the local memory, wherein the processing module functions to:
monitor an encoded data slice access rate to produce an observed encoded data slice access rate for an associated rebuilding rate of a set of rebuilding rates;
apply a learning rate function to the observed encoded data slice access rate based on a previous observed encoded data slice access rate associated with the rebuilding rate to produce an updated previous observed encoded data slice access rate of a set of previous observed encoded data slice access rates, where the set of previous observed encoded data slice access rates corresponds to the set of rebuilding rates;
update a score value associated with the updated previous observed encoded data slice access rate and the rebuilding rate, wherein the score value is calculated as: $((N*\text{rebuild rate})+\text{encoded data slice access rate})^2$, where N is a multiplier of the rebuild rate; and
select an encoded data slice access scheme based on the updated score value where a rebuild rate selection will maximize a score value associated with an expected encoded data slice access rate; and
rebuild the encoded data slice in DSN storage using the encoded data slice access scheme.

16. The computing device of claim 15, wherein the encoded data slice access scheme is any of: a priority encoded data slice access when an encoded data slice access demand rate is much greater than a rebuilding access demand rate; a rebuilding priority scheme when a rebuilding access demand rate is much greater than an encoded data slice access demand rate; or a compromise scheme when a rebuilding access demand rate is substantially similar to an encoded data slice access demand rate.

17. The computing device of claim 15, wherein the learning rate function is calculated as:

updated score=(old score)*(1−learning rate)+(new score*learning rate).

18. An integrity processing unit for determining a rate to rebuild encoded data slices, stored within a dispersed storage network (DSN), the integrity processing unit comprises:
an interface;
a local memory; and
a processing module operably coupled to the interface and the local memory, wherein the processing module functions to:

at each time interval T, select a rebuild rate at which to rebuild data from a range of possible rebuild rates while monitoring an aggregate rate of I/O operations processed in T;

calculate a score value based on the rebuild rate and an I/O rate, the calculating providing a score value for each of a set of possible rebuild rates, the score value calculated as $((N*\text{rebuild rate})+\text{I/O rate})^2$, where N is a multiplier of the rebuild rate;

find a sum total of all the score values for each score value in the set;

divide each score value by this sum total to get weighted probabilities;

wherein, for each time interval T, the integrity processing unit uses the weighted probabilities for a selection of a next rebuild rate to use; and rebuild the data in DSN storage using the next rebuild rate.

* * * * *